UNITED STATES PATENT OFFICE.

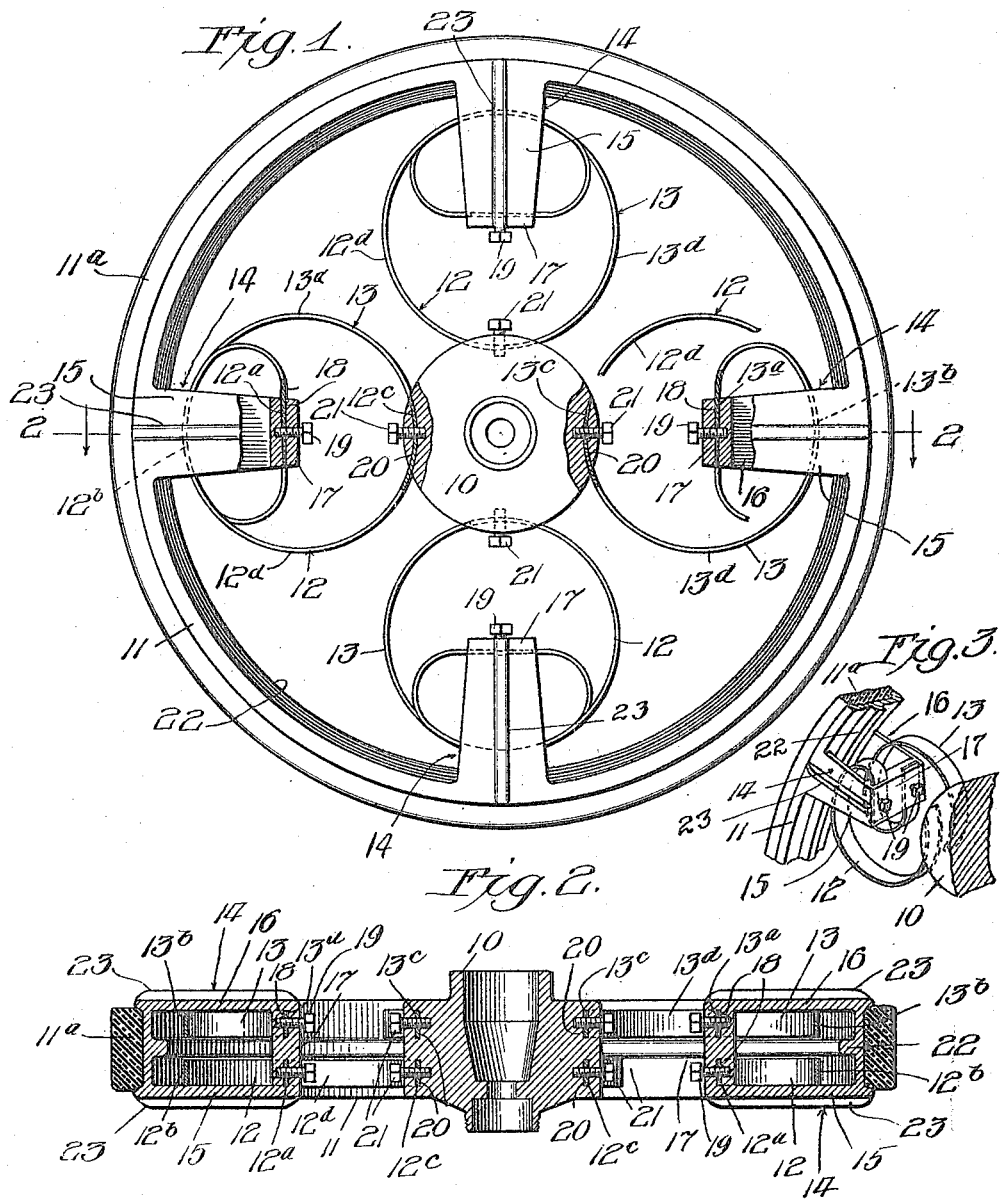
L. DIESEL.
VEHICLE WHEEL.
APPLICATION FILED JULY 24, 1913.
1,136,214.
Patented Apr. 20, 1915.

LAMBERT DIESEL, OF CHICAGO, ILLINOIS.

VEHICLE-WHEEL.

1,136,214.  Specification of Letters Patent.  Patented Apr. 20, 1915.

Application filed July 24, 1913. Serial No. 780,896.

*To all whom it may concern:*

Be it known that I, LAMBERT DIESEL, a citizen of the United States, and a resident of Chicago, in the county of Cook and State of Illinois, have invented certain new and useful Improvements in Vehicle-Wheels; and I do hereby declare that the following is a full, clear, and exact description thereof, reference being had to the accompanying drawings, and to the letters of reference marked thereon, which form a part of this specification.

This invention relates to vehicle wheels and particularly to that class of such devices that are adapted for use on automobiles and other vehicles and which comprise generally a hub, a rim or felly and a cushioning member in the form of a plurality of spring members interposed between and connected with the hub and rim, the spring members being adapted to absorb the shock and jars incident to the travel of the wheel over rough and uneven surfaces.

The particular type of wheels to which the present invention appertains is known in the art as spring wheels.

The object of the invention is to provide improvements in the class of wheels referred to, in the several particulars as will hereinafter appear, and also includes improvements in the arrangement of the spring members employed, whereby the load on the wheel is distributed equally between the several spring members and the spring members will serve to prevent creeping or circumferential movement in both directions of the rim or felly with respect to the hub.

The invention consists in the matters hereinafter described and more particularly pointed out in the appended claims.

In the accompanying drawings illustrating a vehicle wheel embodying my invention—Figure 1 is a side elevation of a wheel constructed in accordance with my invention; portions being broken away and shown in section; Fig. 2 is a sectional view taken on line 2—2 of Fig. 1; and Fig. 3 is a perspective view of a pair of spring members to be hereinafter referred to.

Referring to the drawings, the vehicle wheel shown therein as embodying my invention, comprises a hub 10, a rim or felly 11 preferably made of metal, and a plurality of metallic spring members 12 and 13 interposed between and having connection with said hub and said felly or rim. A rubber tire 11$^a$, preferably of the solid type, is mounted on and fits over the outer periphery of said rim or felly.

As shown in the drawings, the spring members are arranged in pairs, each pair comprising a spring member 12 and 13. The spring members of each pair are identical in construction and preferably have the same curvature. The spring members 12, 13 are preferably made of metal curved in the form shown.

In order to connect the spring members 12, 13 of each pair with the rim or felly 11, a hanger or saddle 14 is provided, one hanger for each pair of spring members. The hanger 14 for each pair of spring members 12, 13 being identical in construction, a description of one hanger will suffice for all. The hanger 14 comprises a pair of laterally spaced or oppositely disposed arms 15, 16 of equal length secured at each side of the rim or felly 11 and extending inwardly and radially therefrom. The arms 15, 16 extend inwardly from said rim or felly the same distance. The arms 15, 16 are rigidly connected with each other at or adjacent their inner ends by a member 17 extending therebetween. As shown in the drawings, the arms 15, 16 are integral with said rim or felly 11 and said member 17 is integral with each of said arms between which it extends, all such parts being preferably made at the time that said rim or felly is cast. The spring members 12, 13 are connected with said hanger 14 by having their outer end portions 12$^a$, 13$^a$ thereof inserted in tapered sockets 18, 18 provided therefor in said member 17. Said sockets 18, 18 are arranged side by side and extend, preferably, through said member 17. Said end portions 12$^a$, 13$^a$ are secured in said sockets 18, 18 by fastening members, preferably in the form of machine screws 19, 19, one for each spring member, screwed into said member 17 and through said end portions 12$^a$, 13$^a$ of said spring members. The spring member 12 of each pair is coiled toward the rim or felly 11 about said member 17 in one direction, while the spring member 13 of each pair is coiled toward said rim or felly about said member 17 in the opposite direction. The outer curved portions 12$^b$, 13$^b$ of the respective spring members 12, 13 of each pair extend between the arms 15, 16 of each hanger in the opposite direction and between the inner circumferential face of said rim or felly and said member 17.

The spring members 12, 13 of each pair are connected with said hub 10 by having the inner end portions 12ᶜ, 13ᶜ thereof inserted in tapered sockets 20, 20 provided therefor in said hub. Said inner end portions 12ᶜ, 13ᶜ are secured in said sockets 20, 20 by fastening members, preferably in the form of machine screws 21, 21 screwed into said hub and through said end portions 12ᶜ, 13ᶜ. Said sockets 20, 20 are arranged side by side as in the case of the sockets in the member 17 and extend preferably through the hub 10. The points of connection of the inner ends of each of said spring members 12, 13 are in radial alinement with the points of connection of each of the spring members with the hanger 14. The curved portions 12ᵈ, 13ᵈ of each of the spring members extend in opposite directions and are located on opposite sides of the hangers with which they have connection. As shown, the curved portions of the spring members 12, 13 of each pair between the points of connection with the hub and the felly or rim curve in the opposite direction. The sockets 18 and 20 are tapered so that the smaller end of the socket is opposite the end into which the end portion of the spring member is inserted (see Fig. 1). The curvature of the spring members 12, 13 of each pair is such that the spring members of each pair form, with each other, a circle, the center of which is preferably nearer the hub than the rim or felly (see Fig. 1). Said curved portion 12ᵈ of each of the several spring members 12 all curve in one and the same direction, while the portion 13ᵈ of each of the several spring members 13 all curve in the opposite direction.

The spring members 12 of each pair having the curved portions between the points of connection with the hub and the rim or felly curved or extending in one direction, constitute in effect one set of spring members, and the spring members 13 of each pair having the curved portions thereof between the point of connection with said hub and said rim or felly curved or extending in the opposite direction, constitute the other set of spring members, said spring members of each set acting in conjunction with each other serve to prevent any creeping or circumferential movement of the rim or felly with respect to the hub in either direction, because there is always one set of spring members resisting such movement of the rim or felly while the other set retards such movement of the rim. The strains or stresses on the set of spring members which curve in the direction in which the rim or felly tends to move or creep will be absorbed or relieved by the set of spring members which curve in the direction opposite to the direction the rim tends to creep. Thus, one set of spring members prevent the other set of spring members from being broken by being straightened or bent in the wrong direction, which would happen in case the curved portions of all of the spring members were curved in the same direction and the rim or felly moved or crept in a direction in which said spring members were curved. By reason of the fact that the point of connection of the spring members of each pair with the rim is nearer the hub than the outer curved portions 12ᵃ, 13ᵃ of said spring members, the movement, if any, of the rim or felly with respect to the hub will be less than in case such point of connection with the rim were nearer the rim than the hub.

By reason of the fact that the points of connection of the spring members of each pair are in radial alinement, the load on the spring members of each pair will be equally distributed between the spring members of the pair supporting the load. The spring members are made to possess a sufficient amount of rigidity transversely to prevent lateral movement of said rim or felly with respect to said hub.

As shown in the drawings, there are four pairs of spring members, 12, 13, thus making the wheel have in effect four spring spokes, each spoke comprising a pair of spring members.

To strengthen or stiffen the rim or felly 11, the same is provided with an inwardly extending annular rib 22. Each arm 15, 16 is provided on its outer side face with a longitudinal rib 23 for the purpose of adding strength to the said arms.

A vehicle wheel constructed in accordance with my invention is strong and durable and comprises but a few parts, such parts being simple in construction and economical to manufacture. The spring members are rigid enough to maintain the rim or felly in properly spaced position from the hub, but elastic or resilient enough to absorb the shocks and jars to which the wheel is subjected in travel over a roadway and perform efficiently all of the functions of the expensive pneumatic tire now commonly employed.

I claim as my invention:—

1. A vehicle wheel, comprising a rim and a hub, a plurality of pairs of springs interposed between said rim and hub, and a hanger for each pair of springs, embracing an arm secured to the rim and extending toward the hub; the springs of each pair being connected at their outer ends with the associated arm, and each spring being curved from its point of connection with the arm in a direction to extend to one side of said arm and toward said rim, and having a portion extending between the rim and point of connection of the spring with said arm; the remaining portion of the spring being on the other side of the arm and curved in a direction away from said arm and toward the hub; the inner end of said spring being secured to said hub; each spring of said pair having the corresponding curved portions located on opposite sides of the associated arm and curved in opposite directions.

2. A vehicle wheel, comprising a rim and a hub, a plurality of pairs of springs interposed between said rim and hub, and a hanger for each pair of springs, embracing laterally spaced arms secured to the rim and extending toward the hub; the arms of each hanger being connected together at their ends by a connecting member; the springs of each pair having their outer ends secured to said connecting member, and each spring being curved from said member outwardly to one side of said hanger and toward said rim and having a portion passing between said arms and between the rim and connecting member; the remaining portion of the spring being located on the other side of the hanger and curved from the hanger toward the hub; the inner end of each spring being secured to said hub; the springs of each pair having their corresponding curved portions on opposite sides of the associated hanger and curved in opposite directions.

3. A vehicle wheel, comprising a rim and a hub, a plurality of springs interposed between said rim and hub, a hanger for each spring, embracing an arm secured to said rim and extending toward the hub, a spring secured to each arm and curved from its point of connection with said arm in a direction to extend to one side of the arm and toward the rim and having a portion extending between the rim and the point of connection of the spring with the arm; the remaining portion of the spring being on the other side of the arm and curved toward said hub, the inner end of each spring being secured to said hub; the springs being arranged in sets and the springs of one set having their curved portions curved in a direction opposite to the direction of curvature of the corresponding curved portions of the springs of the other set.

In testimony that I claim the foregoing as my invention I affix my signature in the presence of two witnesses, this 9th day of June A. D. 1913.

LAMBERT DIESEL.

Witnesses:
 EUGENE C. WANN,
 MAURICE D. HERMAN.

Copies of this patent may be obtained for five cents each, by addressing the "Commissioner of Patents, Washington, D. C."